Patented July 1, 1947

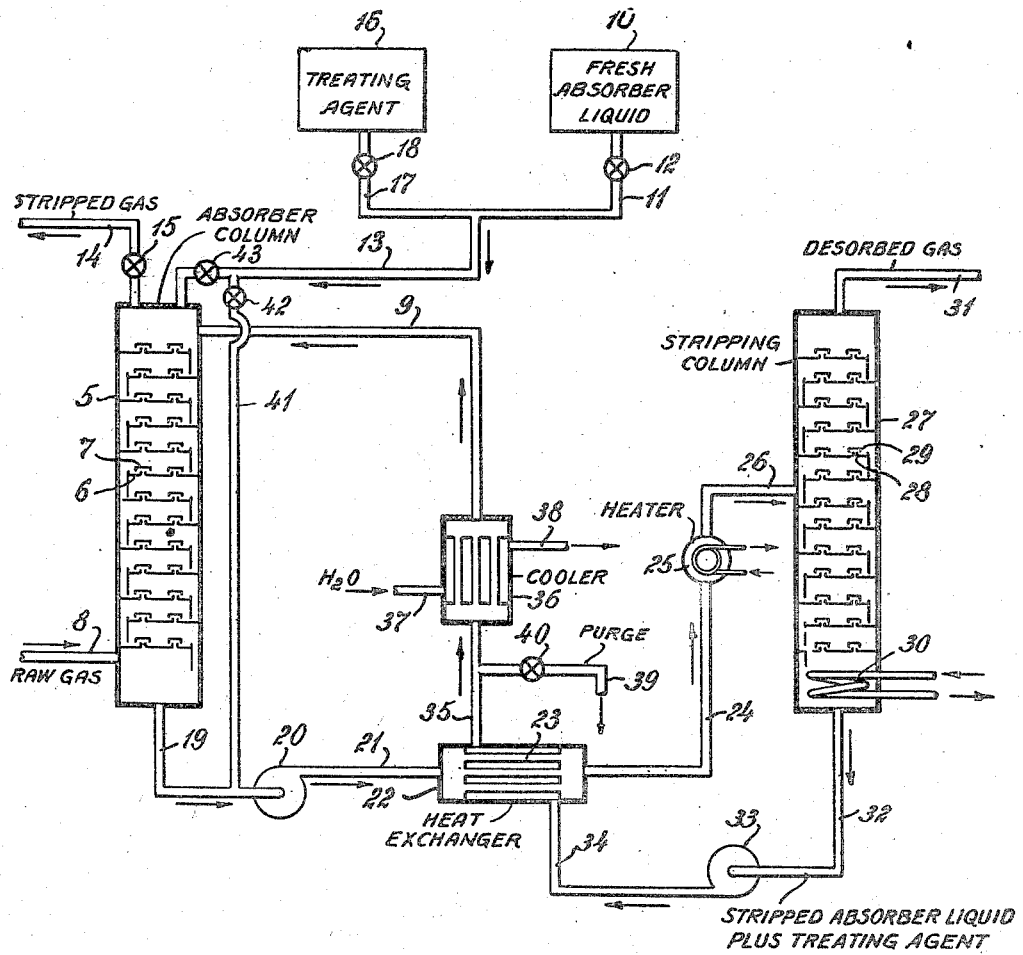

2,423,238

UNITED STATES PATENT OFFICE 2,423,238

PRODUCTION OF GASEOUS HYDROCARBON PRODUCTS FREE FROM VOLATILE SULPHUR COMPOUNDS

Charles O. Hoover, Houston, Tex., assignor to Air Reduction Company, Incorporated, New York, N. Y., a corporation of New York Application February 7, 1945, Serial No. 576,690

7 Claims. (Cl. 23—3)

This invention relates to the recovery of hydrocarbon products free from undesirable volatile sulfur compounds from materials containing such compounds and particularly to an improved method of separating hydrogen sulfide, mercaptans and disulfides from such products.

Hydrocarbon vapors and gases, especially those derived from natural sources, often contain substantial proportions of hydrogen sulfide, mercaptans and disulfides. These compounds are highly corrosive to stills, pumps, pipe lines and other apparatus and act as poisons to catalysts which may be employed in converting or modifying the products, as for example in isomerization and alkylation.

It is the object of the invention to provide a simple, economical and effective method of recovering hydrocarbon products free from deleterious sulfur compounds.

Another object of the invention is the conversion of undesirable volatile sulfur compounds into non-volatile compounds from which volatile hydrocarbons can be separated readily.

Other objects and advantages of the invention will be apparent as it is better understood by reference to the following specification and the accompanying drawing, which illustrates diagrammatically an apparatus suitable for the practice of the invention.

In carrying out the invention, the gases or vapors containing the sulfur compounds are absorbed in an absorption oil. Any suitable hydrocarbon oil which does not vaporize at the temperature to which it is subjected, such as gas oil, may be used. During absorption, the gases and vapors are subjected to treatment with cuprous naphthenate contained in the absorption oil and the volatile sulfur compounds are thereby converted to relatively stable sulfur compounds. This is accomplished readily through reaction of cuprous naphthenate with the volatile sulfur compounds. Thus hydrogen sulfide reacts to form cuprous sulfide which is precipitated as a finely divided solid and remains in suspension in the oil. Mercaptans react to form cuprous mercaptides which are non-volatile. The reaction of the disulfides is somewhat more complicated. Nevertheless they are converted to relatively stable, non-volatile compounds. Following the treatment described, the absorbed gases and vapors are vaporized by the application of heat, and the absorption oil containing the converted sulfur compounds and any unreacted treating agent is returned for further use in the procedure.

Although the operation is not limited to any particular type of apparatus, it may be conducted effectively in apparatus comprising an absorber column and a stripping column with convenient accessories to permit circulation of the absorbing oil between the two columns and the addition of materials as required to make up losses. Thus the hydrocarbon gas or vapors may be absorbed in the absorber column wherein cuprous naphthenate is supplied to effect conversion of the sulfur compounds. The absorbing oil can be withdrawn continuously and delivered to the stripping column where heat is applied to vaporize the hydrocarbons which have been freed from hydrogen sulfide, mercaptans and disulfides, the absorbing oil containing unreacted treating agent being returned for further use in the absorber column. The procedure permits the continuous treatment of the hydrocarbon gases or vapors and continuous recovery of the gases or vapors free from volatile sulfur compounds.

It will be better understood by reference to the drawing, in which 5 indicates the absorber column provided with trays 6 and bubble caps 7. or other convenient means to ensure adequate contact between the absorbing oil in the column and the gases or vapors introduced through a pipe 8. The gases or vapors pass upwardly in contact with the absorber oil which is continuously supplied through a pipe 9. Additional absorbing oil to make up any losses may be supplied from a tank 10 through a pipe 11 controlled by a valve 12 which is connected to a pipe 13 to deliver the oil to the top of the column 5. The residue of the gases or vapors which pass through the column 5 unabsorbed are delivered through a pipe 14 controlled by a valve 15 to any suitable storage receptacle.

To supply cuprous naphthenate in suitable form to the column 5, a tank 16 is connected by a pipe 17 controlled by a valve 18 to the pipe 13. The cuprous naphthenate is preferably dissolved in a suitable hydrocarbon oil which does not vaporize to any substantial extent under the conditions of operation. Gas oil is a convenient medium. The proportion of cuprous naphthenate may be varied widely. An amount sufficient to afford a dilute solution ranging in concentration from a fraction of 1% to about 10% or more in the column 5 is usually effective. It is to be understood that the cuprous naphthenate circulates with the absorbing oil, and it is necessary merely to supply additional amounts to make up for the cuprous naphthenate which is reacted in the column 5.

From the column 5, the absorbing oil with the absorbed gases or vapors is delivered by a pipe 19 to a pump 20 and thence by a pipe 21 to a heat exchanger 22. Passing through the tubes 23 of the heat exchanger, the oil is delivered by a pipe 24 to a heater 25 where its temperature may be raised by the use of steam or other heating agent supplied to the heater. From the heater, the oil passes through a pipe 26 to the stripping column 27, which may be provided with trays 28 and bubble caps 29 or other convenient means to ensure adequate contact between vapors ascending through the column and the liquid descending therein. A steam coil or other heating device 30 is disposed at the bottom of the column. As the result of the heating action, the hydrocarbon gases or vapors are separated from the absorbing oil and escape through a pipe 31 which may deliver them to any suitable storage receptacle. The product is free from hydrogen sulfide, mercaptans and disulfides, which have been converted into stable compounds and are retained by the absorbing oil.

The absorbing oil is withdrawn from the column 27 through a pipe 32 and delivered by a pump 33 and pipe 34 to the heat exchanger 22. Passing about the tubes 23 of the exchanger and being cooled thereby, the oil is delivered through a pipe 35 to a second exchanger 36 wherein it is further cooled by water or other suitable cooling medium circulating through the pipes 37 and 38. A portion of the oil may be withdrawn through a pipe 39 controlled by a valve 40 to avoid excessive concentration of converted sulfur compounds in the circulating oil. Such oil may be wasted or subjected to treatment for recovery of the values therein. From the exchanger 36 the oil is delivered through the pipe 9 to the column 5 for further use in the operation.

By provision of a pipe 41 controlled by a valve 42 between the pipes 13 and 19 and a valve 43 in the pipe 13, it is possible to effect the operation in an alternative form in which the cuprous naphthenate is introduced to the pipe 19 before the absorption oil passes through the pump 20. This operation permits the use of the minimum amount of cuprous naphthenate to effect the desired reaction and affords somewhat more economical operation.

As an example, natural gasoline may be produced by scrubbing a "wet" natural gas with an absorption oil such as gas oil in the column 5 in which cuprous naphthenate is employed in accordance with the foregoing description to convert hydrogen sulfide, mercaptans and disulfides which are normally present in natural gas into stable sulfur compounds. The absorption oil including the gases or vapors absorbed from the natural gas is then heated to vaporize the dissolved hydrocarbons, and the absorption oil is returned for further use. The vaporized hydrocarbons may be condensed to afford natural gasoline which is free from hydrogen sulfide, mercaptans and disulfides. It may be blended with other hydrocarbons to form high octane motor fuel. It may also be used as a raw material for isomerization and alkylation processes.

While cuprous naphthenate is the preferred reagent in the method, other lower valence copper compounds such as the oleate, linoleate, stearate, resinate, and acetate may be employed in a similar manner with like results. It is essential to avoid the cupric compounds which do not afford the advantages of the present invention.

The invention is not limited to the particular application described, since obviously it may be utilized for the treatment of hydrocarbon gases or vapors derived from the treatment of petroleum or from other sources. It is generally applicable to the treatment of such gases and vapors containing hydrogen sulfide, mercaptans and disulfides. Conversion of the volatile sulfur compounds mentioned is accomplished readily by reaction with cuprous naphthenate in the manner herein described. Hence the invention affords a simple and practical procedure for the preparation of hydrocarbon products free from these deleterious sulfur compounds.

Various changes may be made in the details of procedure and in the apparatus employed without departing from the invention or sacrificing the advantages thereof.

I claim:

1. The method of recovering from hydrocarbon gases and vapors, a product free from hydrogen sulfide, mercaptans and disulfides, which comprises absorbing the hydrocarbon gases and vapors in an absorbing oil, treating the absorbing oil with an oil-soluble cuprous compound and vaporizing from the solution and recovering the absorbed hydrocarbon gases and vapors free from the aforesaid sulfur compounds.

2. The method of recovering a product free from hydrogen sulfide, mercaptans and disulfides, from hydrocarbon gases and vapors which comprises absorbing the hydrocarbon gases and vapors in an absorbing oil, introducing cuprous naphthenate, thereby converting the sulfur compounds to non-volatile forms and withdrawing and heating the absorbing oil to vaporize the absorbed hydrocarbon gases and vapors free from contaminating sulfur compounds.

3. The method of recovering a product free from hydrogen sulfide, mercaptans and disulfides, from hydrocarbon gases and vapors which comprises absorbing the hydrocarbon gases and vapors in an absorbing oil, introducing cuprous naphthenate, thereby converting the sulfur compounds to non-volatile forms, withdrawing and heating the absorbing oil to vaporize the absorbed hydrocarbon gases and vapors free from contaminating sulfur compounds and returning the absorbing oil for further use in the procedure.

4. The method of recovering a product free from hydrogen sulfide, mercaptans and disulfides, from hydrocarbon gases and vapors which comprises absorbing the hydrocarbon gases and vapors in an absorbing oil, introducing cuprous naphthenate, thereby converting the sulfur compounds to non-volatile forms, and heating the absorbing oil to vaporize the absorbed hydrocarbon gases and vapors free from contaminating sulfur compounds.

5. The method of recovering a product free from hydrogen sulfide, mercaptans and disulfides, from hydrocarbon gases and vapors which comprises absorbing the hydrocarbon gases and vapors in an absorbing oil, introducing cuprous naphthenate, thereby converting the sulfur compounds to non-volatile forms, heating the absorbing oil to vaporize the absorbed hydrocarbon gases and vapors free from contaminating sulfur compounds and returning the absorbing oil for further use in the procedure.

6. The method of recovering a product free from hydrogen sulfide, mercaptans and disulfides, from hydrocarbon gases and vapors which comprises absorbing the hydrocarbon gases and vapors in an absorbing oil containing cuprous naphthenate, thereby converting the sulfur compounds to non-volatile forms, and heating the absorbing oil to vaporize the absorbed hydrocarbon gases and vapors free from contaminating sulfur compounds.

7. The method of recovering a product free from hydrogen sulfide, mercaptans and disulfides, from hydrocarbon gases and vapors which comprises absorbing the hydrocarbon gases and vapors in an absorbing oil containing cuprous naphthenate, thereby converting the sulfur compounds to non-volatile forms, heating the absorbing oil to vaporize the absorbed hydrocarbon gases and vapors free from contaminating sulfur compounds and returning the absorbing oil for further use in the procedure.

CHARLES O. HOOVER.

REFERENCES CITED

The following references are of record in the file of this patent:

UNITED STATES PATENTS

| Number | Name | Date |
| --- | --- | --- |
| 2,372,084 | Jones | Mar. 20, 1945 |
| 2,066,213 | Merchant | Dec. 29, 1936 |
| 2,297,620 | Henderson et al. | Sept. 29, 1942 |
| 2,276,526 | Von Fuchs et al. | Mar. 17, 1942 |
| 1,365,894 | Day | Jan. 18, 1921 |
| 1,608,339 | Ridge et al. | Nov. 23, 1926 |
| 2,091,239 | Hall | Aug. 24, 1937 |